(12) United States Patent
Hassan et al.

(10) Patent No.: US 12,080,949 B2
(45) Date of Patent: Sep. 3, 2024

(54) SINGLE PORT ORTHOGONALLY POLARIZED ANTENNA FOR HANDSETS, IOT TERMINALS, AND VEHICLES

(71) Applicants: Noha Hassan, Cairo (EG); Mohamed Sanad, Cairo (EG)

(72) Inventors: Noha Hassan, Cairo (EG); Mohamed Sanad, Cairo (EG)

( * ) Notice: Subject to any disclaimer, the term of this patent is extended or adjusted under 35 U.S.C. 154(b) by 134 days.

(21) Appl. No.: 17/808,522

(22) Filed: Jun. 23, 2022

(65) Prior Publication Data

US 2022/0328981 A1 Oct. 13, 2022

Related U.S. Application Data

(63) Continuation-in-part of application No. 17/655,172, filed on Mar. 16, 2022, now abandoned.

(60) Provisional application No. 63/161,676, filed on Mar. 16, 2021.

(51) Int. Cl.
*H01Q 21/28* (2006.01)
*H01Q 1/24* (2006.01)
*H01Q 1/32* (2006.01)
*H01Q 5/357* (2015.01)
*H04B 7/0413* (2017.01)

(52) U.S. Cl.
CPC ............ *H01Q 21/28* (2013.01); *H01Q 1/243* (2013.01); *H01Q 1/3291* (2013.01); *H01Q 5/357* (2015.01); *H04B 7/0413* (2013.01)

(58) Field of Classification Search
CPC ........ H01Q 21/28; H01Q 5/357; H01Q 1/243; H01Q 1/3291
See application file for complete search history.

(56) References Cited

U.S. PATENT DOCUMENTS

2023/0335894 A1* 10/2023 Kamyshev ........... H01Q 9/0414

* cited by examiner

*Primary Examiner* — Graham P Smith
(74) *Attorney, Agent, or Firm* — Qadeer LLC

(57) ABSTRACT

A single port orthogonally terminal polarized antenna is disclosed herein. The antenna may be used in apparatuses including but not limited to handsets, Internet of Things (IoT) terminals, and vehicles. The antenna significantly reduces the need for spatial diversity multiple-in and multiple-out (MIMO) in terminals.

15 Claims, 15 Drawing Sheets

SINGLE PORT ORTHOGONALLY POLARIZED ANTENNA FOR HANDSETS, IOT TERMINALS, AND VEHICLES

CROSS-REFERENCE TO RELATED APPLICATIONS

This application is a continuation-in-part of U.S. patent application Ser. No. 17/655,172, fled on Mar. 16, 2022, which claims the benefit of U.S. Provisional Patent Application Ser. No. 63/161,676, filed on Mar. 16, 2021, the entireties of which are hereby incorporated herein by reference.

BACKGROUND

The present disclosure relates to the field of broadband resonant antennas.

SUMMARY

A single port orthogonally polarized terminal antenna is disclosed hemin. Use of the disclosed antenna significantly reduces the need for spatial diversity MIMO in terminals. The single port orthogonally polarized terminal antenna is equally sensitive in two perpendicular polarizations. Thus, a spatially separated dual multiple-in and multiple-out (MIMO) antenna configuration is replaced by a single port orthogonally polarized terminal antenna.

The single port orthogonally polarized terminal antenna may reduce the need for spatial diversity MIMO in base station antennas. The single port orthogonally polarized terminal antenna may function as a feed for a dual parabolic cylindrical reflector base station antenna, by replacing the two spatially separated ±45° polarization feeds.

Additionally, the need for a spatial multiplexing MIMO may also be significantly reduced by using the multi-beam dual parabolic cylindrical reflector antenna. This is both because of its wide frequency bandwidth and its high capacity, with a large number of beams to achieve a simultaneous vertical and horizontal sectorization.

Further, the number of ports of the base station antenna is equal to the number of beams. This results from replacing the two spatially separated ±45° polarization feeds with an orthogonally polarized feed with a single port. This makes the antenna easier to handle. Additionally, the implementation of the single port orthogonally polarized terminal antenna improves signal reception in vehicles.

The single port orthogonally polarized terminal antenna in conjunction with the single linearly polarized antenna result in improved reception with a 2×2 MIMO configuration. The 2×2 MIMO configuration results in a more efficient configuration (i.e., 3×3 MIMO and 4×4 MIMO) and better performance.

Each of the foregoing and various aspects, together with those set forth below and summarized above or otherwise disclosed herein, including the figures, may be combined without limitation to form claims for a device, apparatus, system, method of manufacture, and/or method of use.

DETAILED DESCRIPTION

A single port orthogonally polarized terminal antenna is disclosed herein. Use of the disclosed antenna significantly reduces the need for spatial diversity MIMO in terminals. The single port orthogonally polarized terminal antenna is equally sensitive in two perpendicular polarizations. Thus, a spatially separated dual multiple-in and multiple-out (MIMO) antenna configuration is replaced by a single port orthogonally polarized terminal antenna.

The single port orthogonally polarized terminal antenna may reduce the need for spatial diversity MIMO in base station antennas. The single port orthogonally polarized terminal antenna may function as a feed for a dual parabolic cylindrical reflector base station antenna, by replacing the two spatially separated ±45° polarization feeds.

Additionally, the need for a spatial multiplexing MIMO may also be significantly reduced by using the multi-beam dual parabolic cylindrical reflector antenna. This is both because of its wide frequency bandwidth and its high capacity, with a large number of beams to achieve a simultaneous vertical and horizontal sectorization.

Further, the number of ports of the base station antenna is equal to the number of beams. This results from replacing the two spatially separated ±45° polarization feeds with an orthogonally polarized feed with a single port. This makes the antenna easier to handle. Additionally, the implementation of the single port orthogonally polarized terminal antenna improves signal reception in vehicles.

The single port orthogonally polarized terminal antenna in conjunction with the single linearly polarized antenna result in improved reception with a 2×2 MIMO configuration. The 2×2 MIMO configuration results in a more efficient configuration (i.e., 3×3 MIMO and 4×4 MIMO) and better performance.

Figure 1:
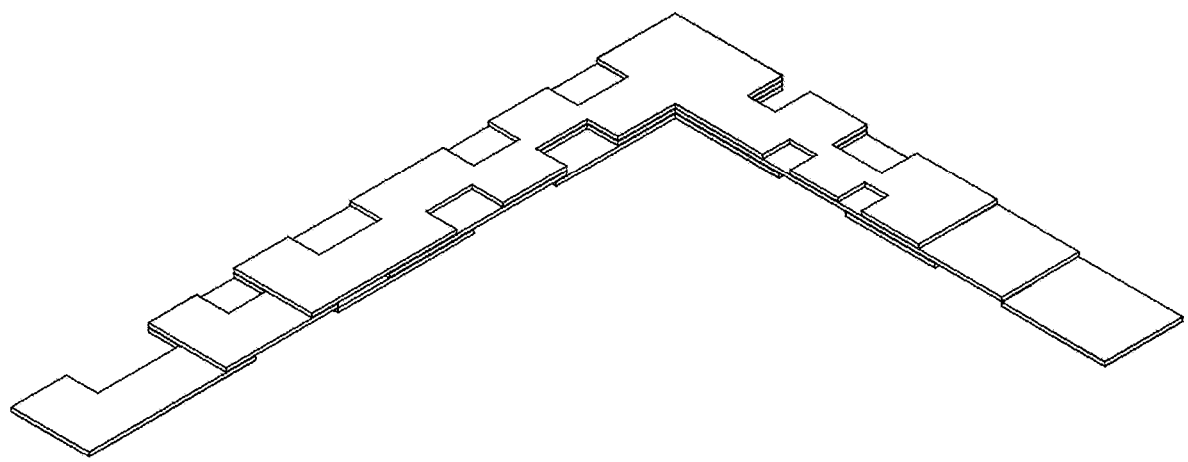
FIG. 1 is a perspective view of the assembly for an embodiment of the disclosed antenna.

In some embodiments, the antenna comprises a first arm, a second arm, and a third arm. The first arm, second arm, and third arm may preferably be made from a conductive material, such as metal. The first arm, second arm, and third arm comprise an orthogonal geometrical profile as shown in FIG. 1. The first arm, second arm, and third arm are adjacent, parallel, and colinear when assembled.

Figure 2:
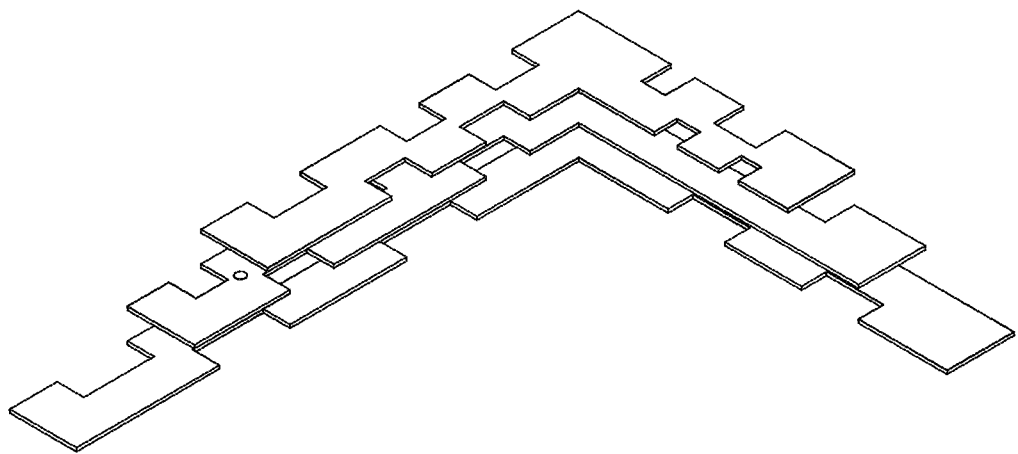
FIG. 2 is an exploded perspective view of the assembly for an embodiment of the disclosed antenna.
Figure 3:
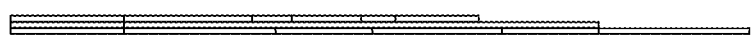
FIG. 3 is a front view of the assembly for an embodiment of the disclosed antenna.
Figure 4:
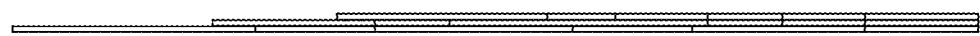
FIG. 4 is a right view of the assembly for an embodiment of the disclosed antenna.
Figure 5:
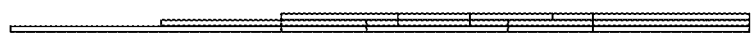
FIG. 5 is a rear view of the assembly for an embodiment of the disclosed antenna.
Figure 6:
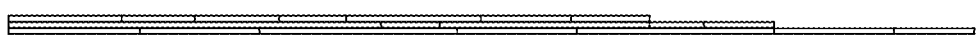
FIG. 6 is a left view of the assembly for an embodiment of the disclosed antenna.
Figure 7:
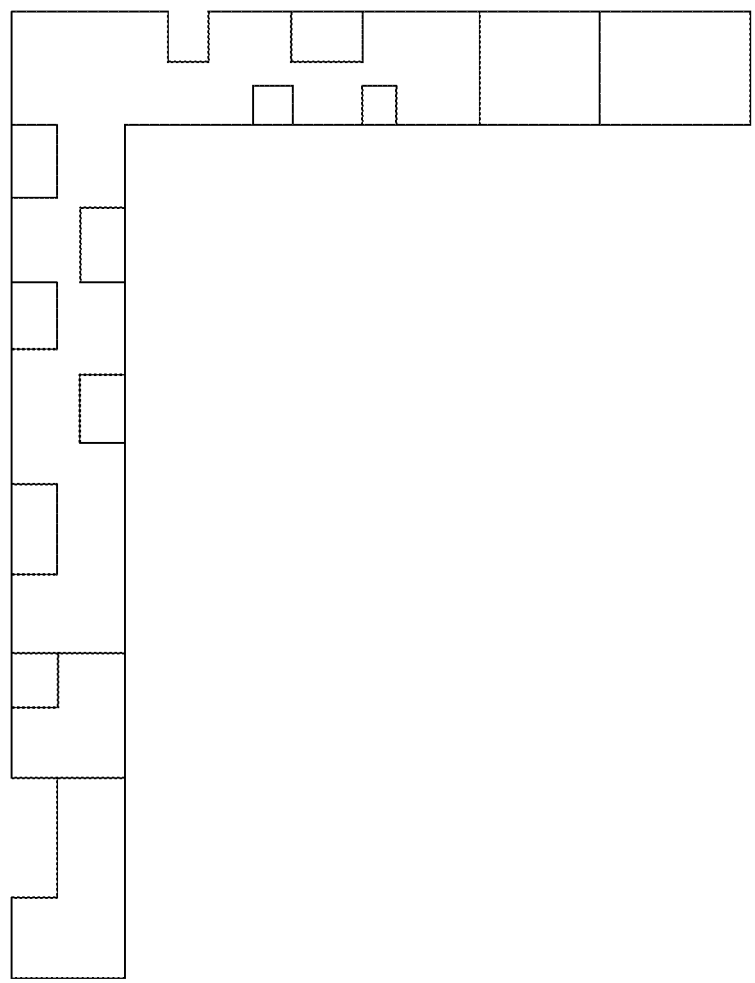
FIG. 7 is a top view of the assembly for an embodiment of the disclosed antenna.
Figure 8:
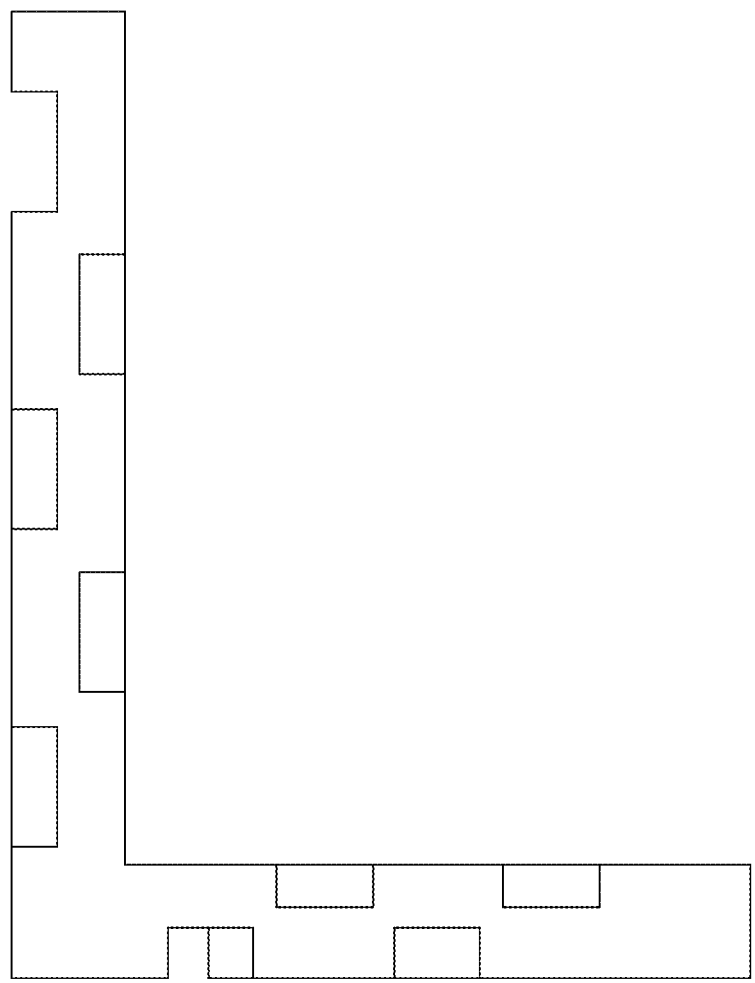
FIG. 8 is a bottom view of the assembly for an embodiment of the disclosed antenna.

In addition, the antenna includes a feed point, as shown in FIG. 2. The location of the feed point may be adjusted as necessary in order to improve return loss. The lengths of the first arm, second arm, and third arm are dimensionally related. Preferably, the length of the first arm is greater than the length of the second arm, and the length of the second arm is greater than the length of the third arm.

In some preferred embodiments, the first arm is the base layer, the second arm is the middle layer, and the third arm is the top layer, as shown in FIG. 2. In addition, the first arm, second arm, and third arm have a plurality of slots. The plurality of slots may have any geometrical profile which fulfills design, manufacturing, and/or user requirements.

The dimensions of the first arm, second arm, and third arm and the plurality of slots provide the necessary configuration such that the disclosed antenna does not require any matching/tuning circuits or any additional extended ground planes. Thus, the dimensions of the antenna are directly correlated with its performance.

In some embodiments, the length of the first arm determines the operating frequency of the antenna. Additional parameters such as bandwidth, peak gain, and efficiency are mainly determined by the widths of the second arm and the third arm. In addition, the arrangement of the plurality of slots may be optimized so as to enhance performance, particularly with respect to bandwidth.

In some preferred embodiments, the feeding method for the antenna is a direct feed into the first arm and second arm, while the third arm is fed via coupling. The direct feed into the first arm and second arm may be via a coaxial cable.

The disclosed antenna preferably covers the entire Long Term Evolution (LTE) band (0.7-5.8 GHz), the 5G sub-6 GHz band (3.3-7 GHz), and/or the mm-wave band (24-34 GHz) for cellular handsets, smart phones, tablets, vehicles, and IoT terminals without using any matching or tuning circuits.

The single port orthogonally polarized terminal antenna significantly reduces the need for spatial diversity MIMO in terminals. The single port orthogonally polarized terminal antenna also reduces the need for spatial diversity MIMO in base station antennas. Further applications include using the antenna as a feed for a dual parabolic cylindrical reflector base station antenna to replace its two spatially separated ±45° polarization feeds.

Additional applications include vehicular applications, where the vehicle in question frequently changes direction. The repeated change of direction affects the polarization of vehicular antennas.

Typically, vehicular antennas are required to communicate with linearly polarized systems such as cellular base stations and circularly polarized systems such as GPS and satellite phones. Additionally, vehicular antennas may be required to communicate with other systems without a free line of sight, which results in multi-path reflections and multiple rotations of polarization.

To overcome the aforementioned challenges, the single port orthogonally polarized terminal antenna is implemented with a single linearly polarized antenna in a 2×2 MIMO configuration.

The single port orthogonally polarized terminal antenna and the single linearly polarized antenna are sensitive to three perpendicular polarizations and circular polarizations. Thus, this vehicular configuration is more efficient in GPS and satellite phones. Use of the disclosed antenna results in improved reception in all directions and polarizations. The isolation between the two antennas of each group is still better than 35 dB over most of the 5G Sub-6 GHz band (3.3-7 GHz).

Additional applications of the single port orthogonally polarized terminal antenna include multi-beam base station antennas. Use of the disclosed antenna results in a significant reduction in the need for MIMO. For example, in recent years a foldable/deployable 5G multi-beam base station antenna was developed by Hassan, et al. The foldable/deployable 5G multi-beam base station antenna could cover the entire sub-6 GHz band (3.3-7.0 GHz) or the mm-wave band (24-34 GHz). It consists of two parabolic cylindrical reflectors and a set of small broadband resonant feeds, where four of these units were used to cover the entire azimuth.

The proposed base station antenna generates an arbitrary number of beams with arbitrary vertical and horizontal beamwidths, arbitrary beam overlapping, and arbitrary electric beam-tilt for each beam. Further, the beams may be shaped in the elevation plane to eliminate any possible ducting and/or interference with surrounding base station antennas. Multi-beam technology may easily be applied to the dual parabolic cylindrical reflector antenna by adding multi-feeds. Shifting the location of a feed away from the focus of the sub-reflector results in tilting of the beam generated by this feed.

Thus, each beam may readily be tilted vertically and/or horizontally by remotely shifting its feed. Further, an array of feeds with different horizontal and vertical shifts may be used in conjunction to generate simultaneous horizontal and vertical sectorization. Thus, the developed multi-beam base station antenna can generate a large number of beams (up to 60 beams with 120 ports for ±45° polarizations). The ±45° polarizations are used in spatial diversity MIMO and/or in spatial multiplexing MIMO. The need for a spatial multiplexing MIMO may be significantly reduced because of the high capacity of the multibeam antenna, with its large number of beams and wide frequency bandwidth.

To reduce the need for spatial diversity MIMO, the single port orthogonally polarized feed antenna is implemented to cover the 5G Sub-6 GHz spectrum (3.3-7.0 GHz) or the mm-wave spectrum (24-34 GHz). Since the antenna is equally sensitive to two perpendicular polarizations (±45°), the two spatially separated ±45° polarization feeds are readily replaced by an orthogonally polarized feed with a single port. Thus, the number of ports is equal to the number of beams.

Figure 9:
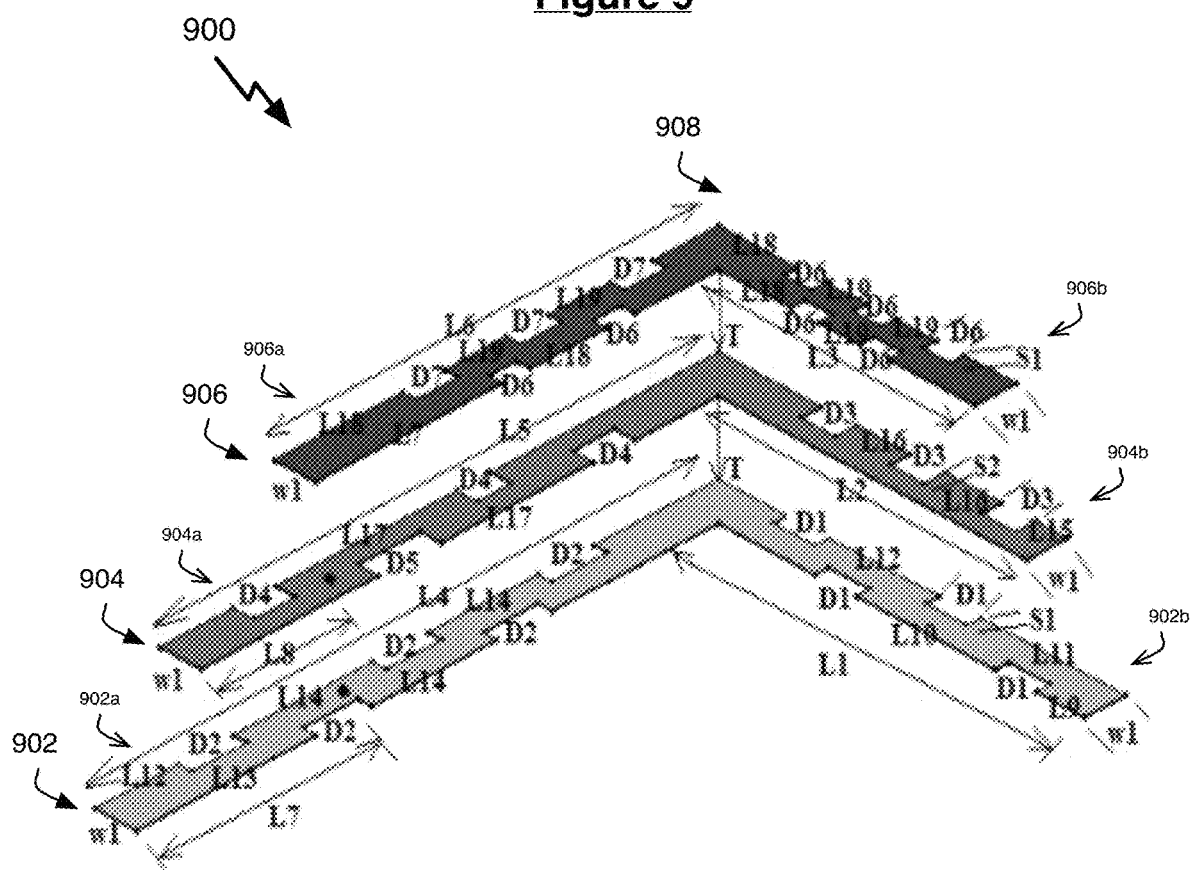
FIG. 9 is an example of the geometry of an orthogonally polarized feed antenna.

With respect to FIG. 9, an example embodiment of a single port orthogonally polarized antenna 900 is shown, which may be used to eliminate or reduce the need for a spatial diversity MIMO application in a terminal. The single port orthogonally polarized antenna may be composed of three arms consisting of a bottom layer 902, a middle layer 904, and a top layer 906. Each arm in this example embodiment is composed of a metallic layer with a 90-degree angle, thereby allowing the antenna to be sensitive to two perpendicular polarizations. In addition, a material such as plastic, foam, or another insulator may be used to keep the metallic layers of the arms apart when assembling such an antenna. Each arm may be described as two radiation elements joined together in an orthogonal arrangement, such that radiation elements 902a and 902b form the bottom layer 902, radiation elements 904a and 904b form the middle layer 904, and radiation elements 906a and 906b form top layer 906.

In terms of implementing a single port orthogonally polarized 5G sub-6 GHz antenna, such an embodiment with respect to FIG. 9 may, for example, have the following values: W1—0.25 cm; L1—1.25 cm; L2—1.03 cm; L3—0.87 cm; L4—2.0 cm; L5—1.8 cm; L6—1.5 cm; L7—0.5 cm; L8—0.3 cm; L9—0.15 cm; L10—0.35 cm; L11—0.3 cm; L12—0.2 cm; L13—0.4 cm; L14—0.3 cm; L15—0.07 cm; L16—0.15 cm; L17—0.4 cm; L18—0.2 cm; L19—0.12 cm; D1—0.1 cm; D2—0.15 cm; D3—0.09 cm; D4—0.08 cm; D5—0.1 cm; D6—0.07 cm; D7—0.09 cm; S1—0.07 cm; S2—0.15 cm; and T—0.15 cm. In such an embodiment, two of the arms may be directly fed at the center of the 90-degree junction as shown at 908 in FIG. 9, while the third arm is fed via coupling.

Such an antenna with these parameters can be manufactured in a variety of ways. For example, thin sheets of very thin plastic material covered with a thin layer of metal may be subject to photo etching, cut, and then assembled to form such an antenna. Alternatively, plastic layers may be formed to the above dimensions and then coated on one side with a metallic spray.

Figure 10:
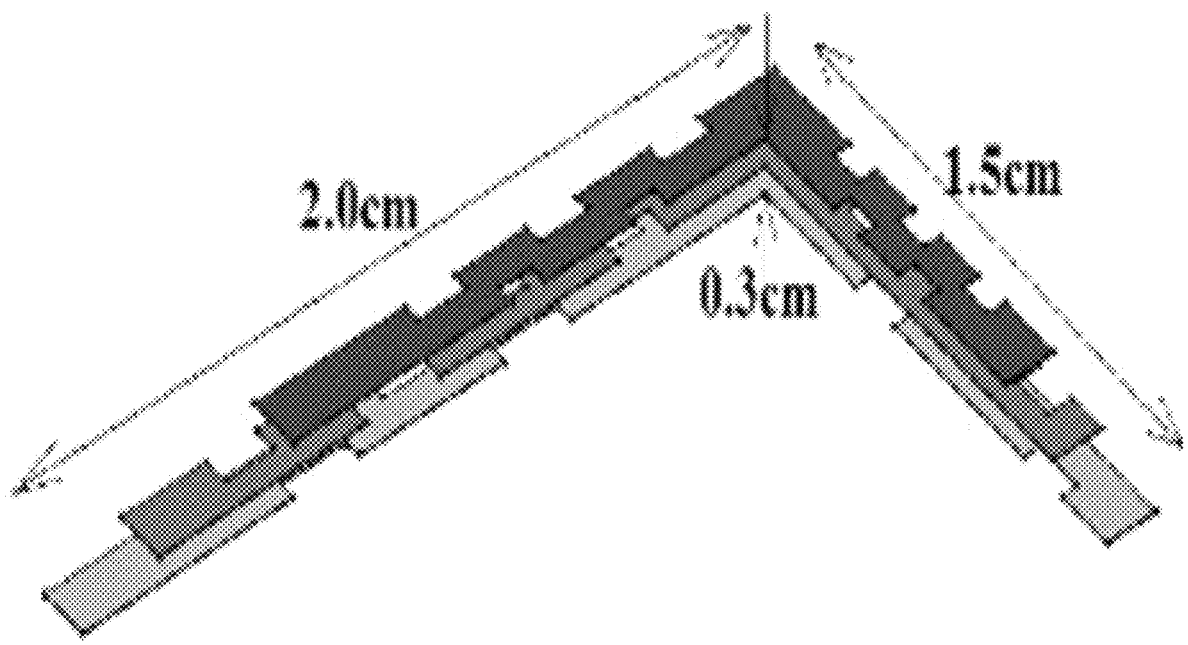
FIG. 10 is example of the overall size of an orthogonally polarized feed antenna.

As shown in FIG. 10, such parameters may result in a compact 5G sub-6 GHz antenna with a width of 2.0 cm, a length of 1.5 cm, and a height of 0.3 cm. With such a resonant antenna design, this can represent the overall size of the antenna as matching, tuning circuits, and additional extended ground planes are not necessarily required. Accordingly, such a single port orthogonally polarized antenna can be used to replace two spatially separated MIMO antennas, thereby reducing the space required for antenna operation in a device.

Figure 11:
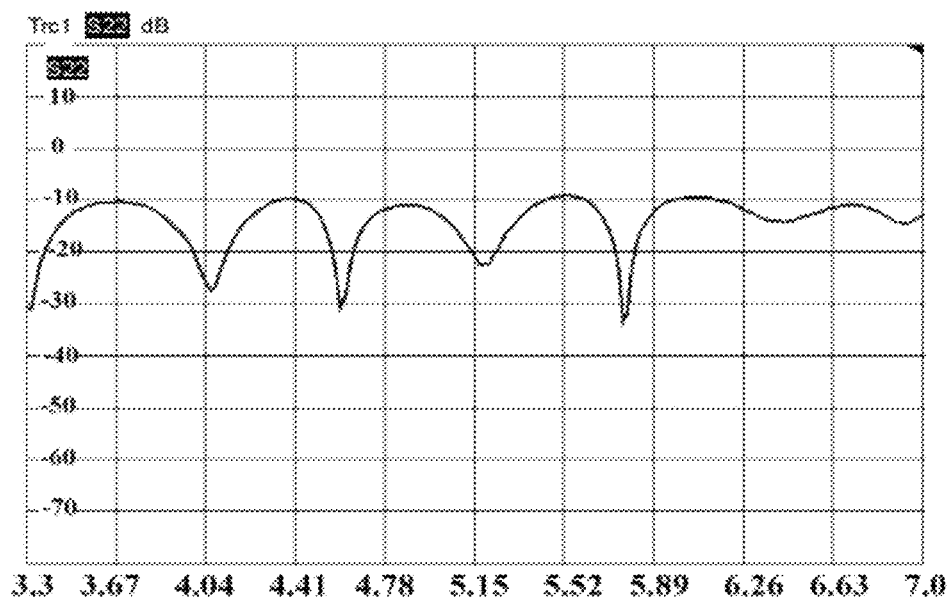
FIG. 11 is a graph of the reflection coefficient of a 5G Sub-6 GHz orthogonally polarized antenna.
Figure 12:
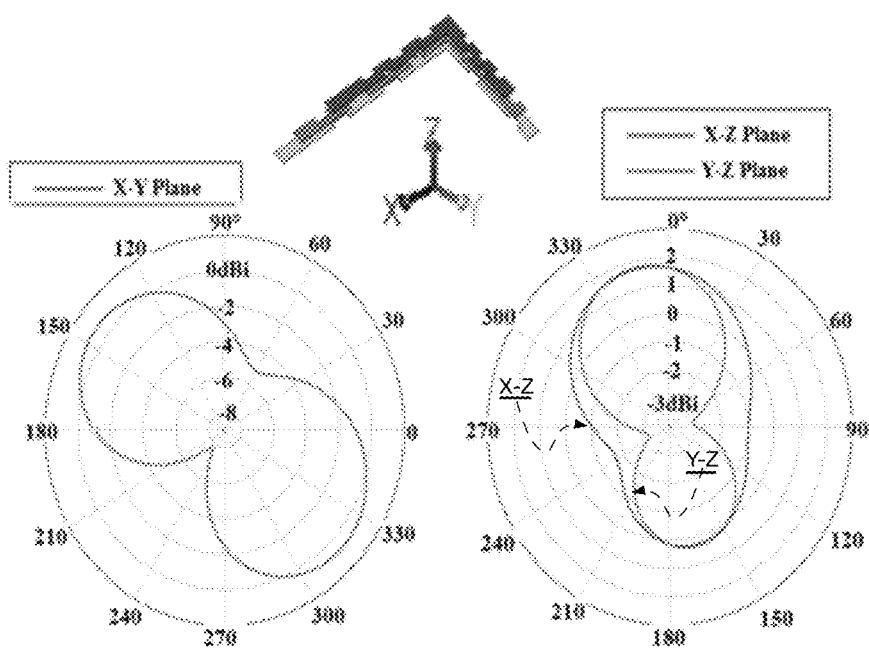
FIG. 12 is a representation of the radiation pattern of an orthogonally polarized antenna at 4.0 GHz.

With respect to FIG. 11, a graph is shown of the reflection coefficient of the example embodiment of the single port orthogonally polarized antenna described above. In such a design, further increasing the width or thickness of the antenna will improve the return loss. With respect to FIG. 12, the radiation pattern of the example embodiment of the single port orthogonally polarized antenna is shown at a sample frequency of 4.0 GHz. Due to the single port orthogonally polarized antenna design, such an antenna may achieve a significant reduction in null performance relative to a single polarized antenna. For example, a linearly polarized antenna typically has deep nulls of around −15 dB. By comparison, FIG. 12 shows that the example single port orthogonally polarized antenna has only two light nulls at φ=60° and φ=240° (−3 dB). Accordingly, the example single port orthogonally polarized antenna achieves an improvement of around 12 dB in terms of nulls relative to a linearly polarized antenna. In addition, the radiation patterns as shown in the x-z and y-z planes are highly similar, thereby demonstrating that the single port orthogonally polarized antenna described is sufficiently sensitive to both perpendicular polarizations to provide equal coverage.

Figure 13:
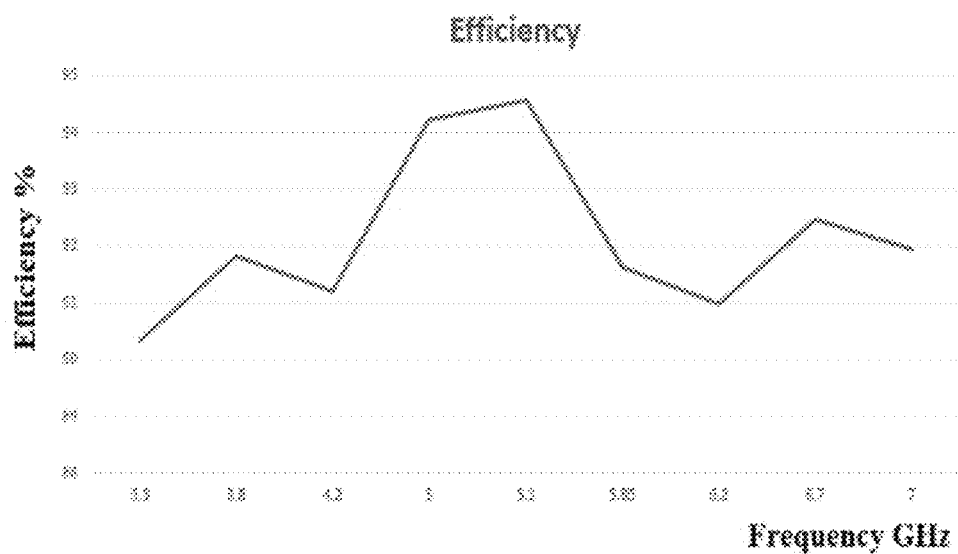
FIG. 13 is a graph of the total efficiency of an orthogonally polarized antenna for both polarizations.

With respect to FIG. 13, a graph of the total efficiency of the example embodiment of the single port orthogonally polarized antenna is shown. Over the frequency band from 3.3 GHz to 7.0 GHz, the example embodiment of the single port orthogonally polarized antenna can provide an antenna efficiency of over 90%.

Figure 14:
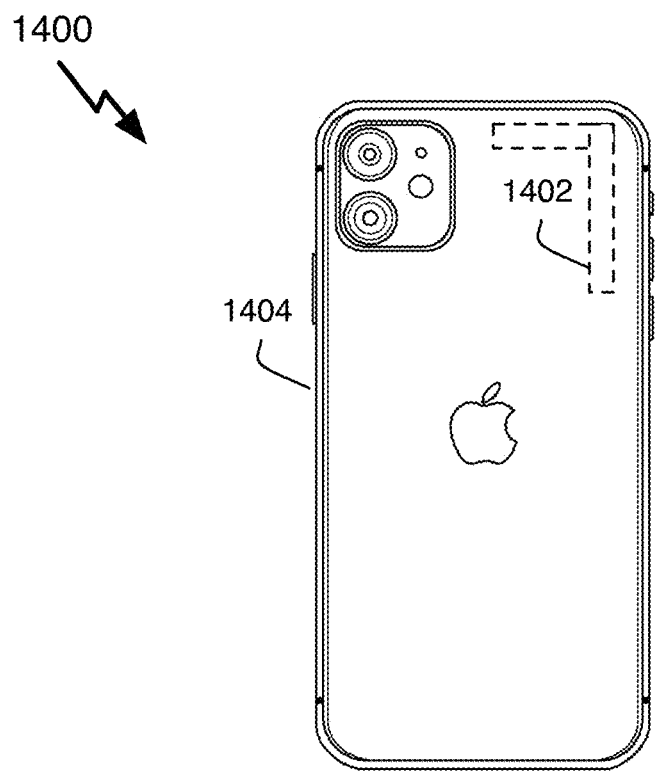
FIG. 14 is an example of the location of single port orthogonally polarized antenna on a cellular handset.
Figure 15:
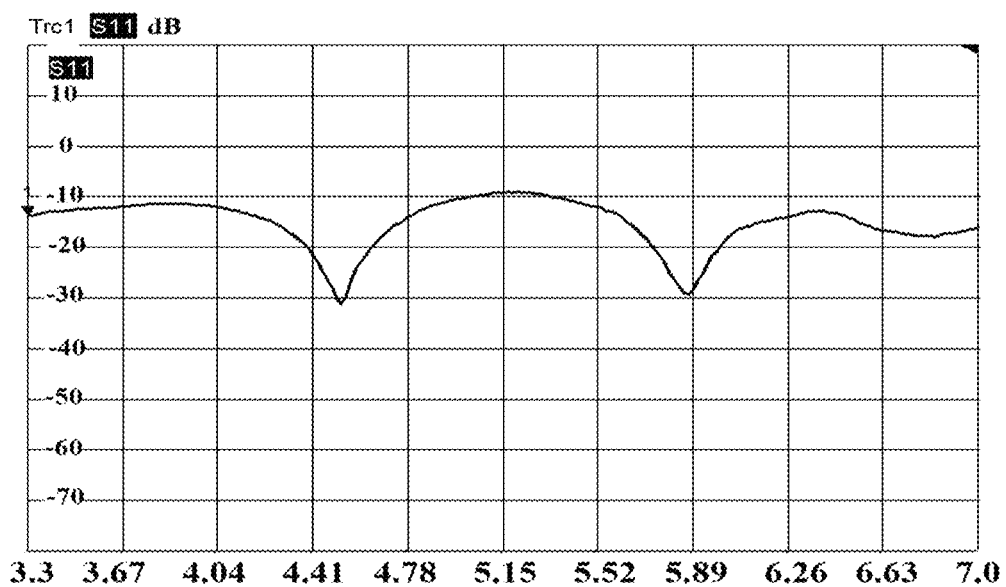
FIG. 15 is a graph of the performance of a single port orthogonally polarized antenna on a cellular phone next to a human body.

With respect to FIG. 14, an example is shown of how a single port orthogonally polarized antenna 1402 may be located near the corner of a cellular handset 1404. In such a configuration, testing has shown that the phone has minimal effect on the performance of a single port orthogonally polarized antenna. For example, FIG. 15 shows the performance of the antenna in such a configuration when held next to a human head. Further, relative to a linearly polarized antenna, a single port orthogonally polarized antenna was demonstrated to consistently achieve higher phone signal strength in testing.

Figure 16:
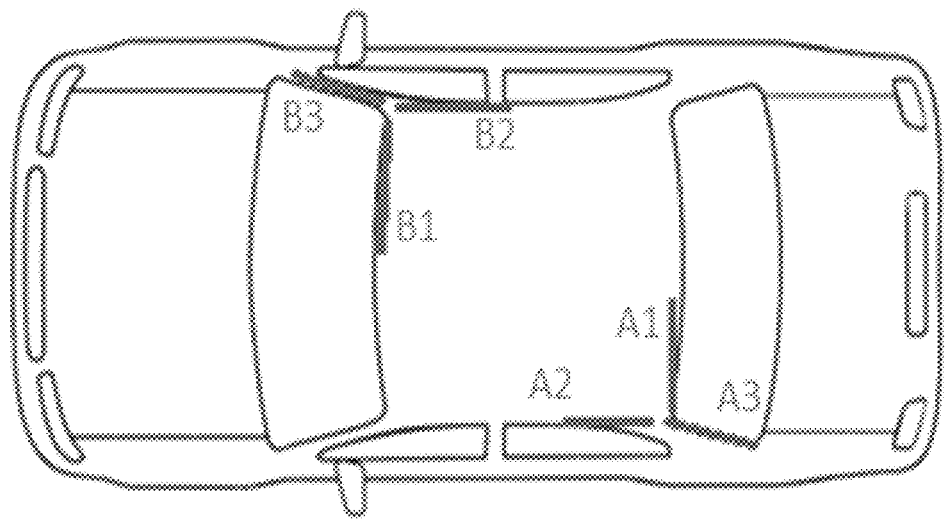
FIG. 16 is an example of the locations for a 6×6 MIMO vehicular antenna configuration.
Figure 17:
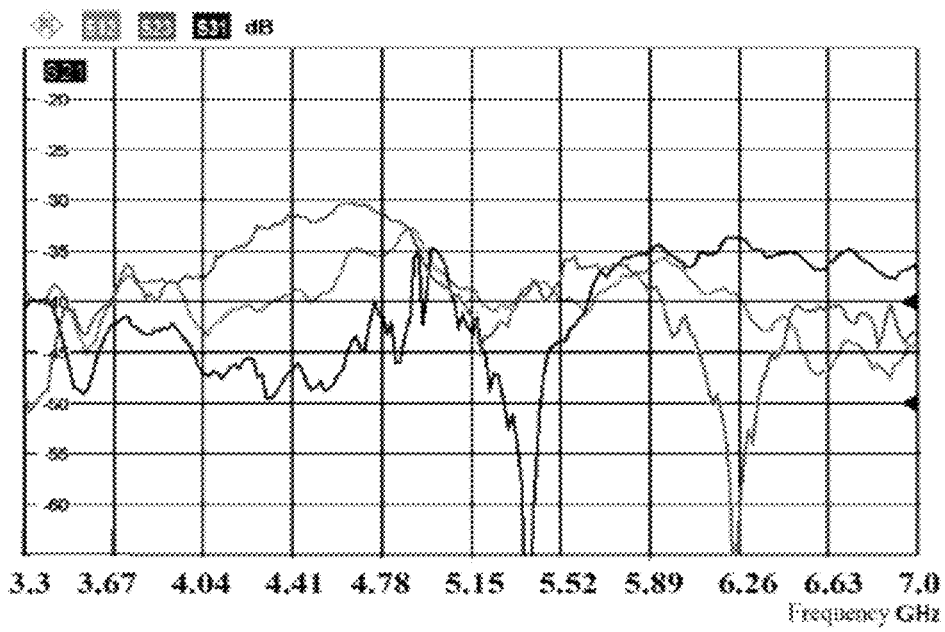
FIG. 17 is a graph of the isolation between three 5G Sub-6 GHz vehicular antennas.

In some embodiments, single port orthogonally polarized antennas may also be used to augment a MIMO configuration rather than replace it. For example, FIG. 16 shows two 3×3 MIMO antenna configurations (A1-A3 and B1-B3 in FIG. 16) located at opposite corners of the car's roof, thereby achieving a 6×6 MIMO antenna configuration. In testing, such a configuration yielded the isolation responses as shown in FIG. 17 between the three linearly polarized antennas in one of the 3×3 MIMO antenna configurations.

Figure 18:
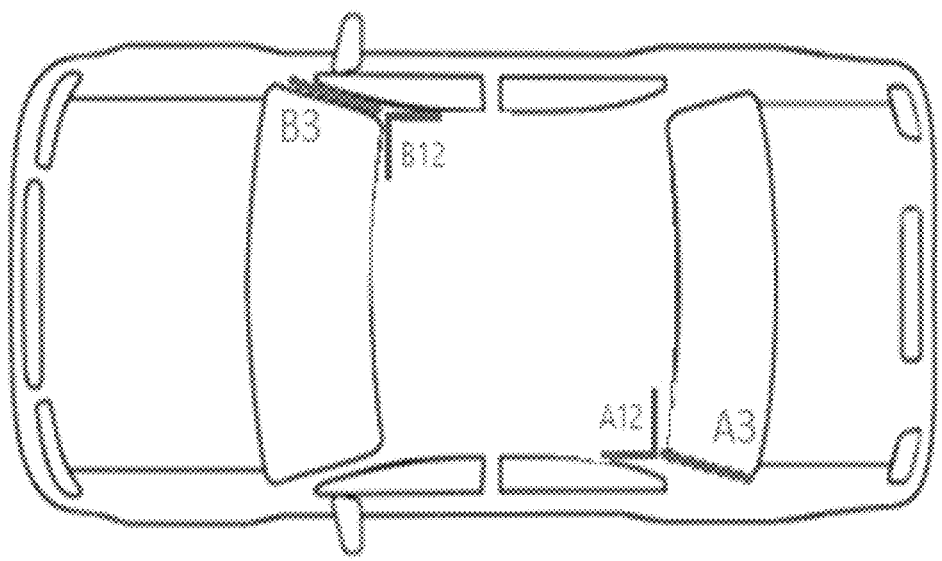
FIG. 18 is an example of the locations for a 4×4 MIMO vehicular antenna configuration.

FIG. 18 shows an example of a similar configuration, except that two of the linearly polarized antennas in each 3×3 MIMO antenna configuration are replaced with a single port orthogonally polarized antenna (as shown by A12/A3 and B12/B3 in FIG. 18, wherein A12 and B12 are single port orthogonally polarized antennas and A3 and B3 are linearly polarized antennas). Such a 2×2 MIMO configuration with a single linearly polarized antenna and a single port orthogonally polarized antenna is advantageous over the 3×3 MIMO antenna configuration using only linearly polarized antennas, as the single port orthogonally polarized antenna provides greater sensitivity to circular polarization. Accordingly, in circumstances involving circular polarization, especially in terms of satellite services (e.g., GPS, satellite radio, satellite phones), the 2×2 MIMO configuration with a single linearly polarized antenna and a single port orthogonally polarized antenna will provide a higher antenna efficiency relative to the 3×3 MIMO antenna configuration using only linearly polarized antennas.

Figure 19:
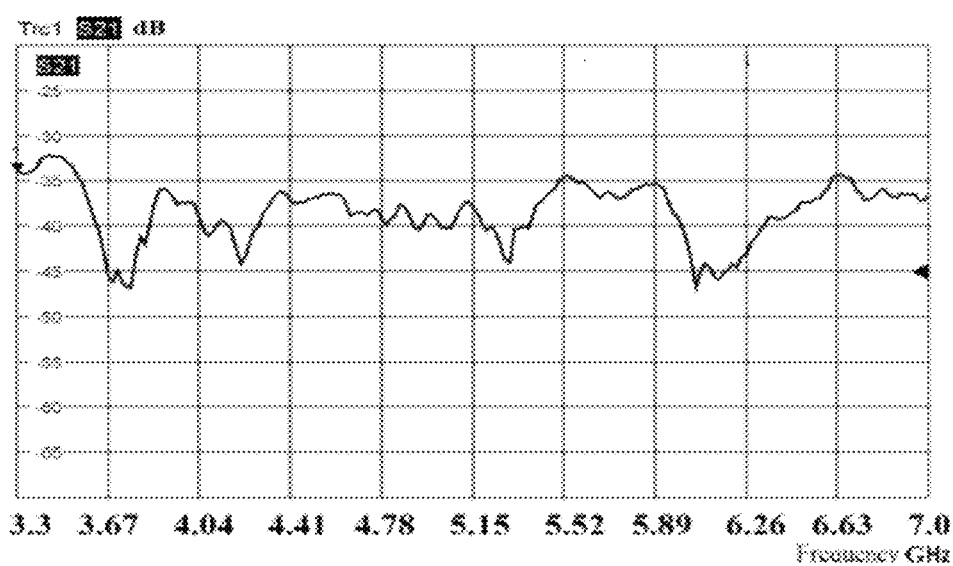
FIG. 19 is a graph of the isolation between a single port orthogonally polarized and linearly polarized 5G Sub-6 GHz vehicular antenna.

In addition, as shown in FIG. 19, by replacing the 3×3 MIMO configurations on a vehicle as described above with a 2×2 MIMO configuration using a single linearly polarized antenna and a single port orthogonally polarized antenna result, such a change results in improved performance in terms of isolation between two such antennas. Between 3.67 GHz and 7.0 GHz, a dual 2×2 MIMO configuration (i.e., 4×4 MIMO configuration in total) in testing was able to achieve approximately 35 dB or better isolation, whereas the dual 3×3 MIMO configuration could only achieve approximately 30 dB or better isolation.

Accordingly, a single port orthogonally polarized antenna as described herein may be used to reduce the need for spatial diversity with respect to MIMO implementations, to augment MIMO implementations to achieve better isolation or sensitivity to circular polarization, or to reduce the impact of antenna nulls relative to linearly polarized antennas, among other applications The previous description of the disclosed embodiments is provided to enable any person skilled in the art to make or use the invention disclosed herein. Although the various inventive aspects are disclosed in the context of certain illustrated embodiments, implementations, and examples, it should be understood by those skilled in the art that the invention extends beyond the specifically disclosed embodiments to other alternative embodiments and/or uses of the invention and obvious modifications and equivalents thereof. In addition, while a number of variations of various inventive aspects have been shown and described in detail, other modifications that are within their scope will be readily apparent to those skilled in the art based upon reviewing this disclosure. It should be also understood that the scope of this disclosure includes the various combinations or sub-combinations of the specific features and aspects of the embodiments disclosed herein, such that the various features, modes of implementation, and aspects of the disclosed subject matter may be combined with or substituted for one another. The generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

Further, any range of numbers recited above describing or claiming various aspects of the invention, such as ranges that represent a particular set of properties, units of measure, conditions, physical states, or percentages, is intended to literally incorporate any number falling within such range, including any subset of numbers or ranges subsumed within any range so recited. The terms "about" and "approximately" when used as modifiers are intended to convey that the numbers and ranges disclosed herein may be flexible as understood by ordinarily skilled artisans and that practice of the disclosed invention by ordinarily skilled artisans using properties that are outside of a literal range will achieve the desired result.

Each of the foregoing and various aspects, together with those summarized above or otherwise disclosed herein, including the figures, may be combined without limitation to form claims for a device, apparatus, system, method of manufacture, and/or method of use.

All references cited herein are hereby expressly incorporated by reference.

What is claimed is:

1. An antenna system comprising:
a base layer consisting of a first antenna component having at least a first set of two radiation elements joined together in an orthogonal arrangement;
a middle layer consisting of a second antenna component having at least a second set of two radiation elements joined together in an orthogonal arrangement;
a top layer consisting of a third antenna component having at least a third set of two radiation elements joined together in an orthogonal arrangement; and
a feed port;
wherein the combined length of both radiation elements of the first set of two radiation elements is longer than the combined length of both radiation elements of the second set of two radiation elements and the combined length of both radiation elements of the second set of two radiation elements is longer than the combined length of both radiation elements of the third set of two radiation elements; and
wherein the antenna system has over 90% efficiency within the specified design bandwidth.

2. The antenna system of claim 1, wherein the antenna system is located within a mobile device and is aligned with a corner of said mobile device.

3. The antenna system of claim 1, wherein the antenna system has nulls of approximately −3 dB or less in the x-y plane.

4. The antenna system of claim 1, wherein the antenna system is combined with one or more linearly polarized antennas to form a MIMO antenna configuration.

5. The antenna system of claim 4, wherein the MIMO antenna configuration is located on a vehicle.

6. An antenna system for receiving circularly polarized satellite signals comprising:
a first antenna system, wherein the first antenna system is composed of:
a base layer consisting of a first antenna component having at least a first set of two radiation elements joined together in an orthogonal arrangement;
a middle layer consisting of a second antenna component having at least a second set of two radiation elements joined together in an orthogonal arrangement;
a top layer consisting of a third antenna component having at least a third set of two radiation elements joined together in an orthogonal arrangement; and
a feed port; and
a second antenna system consisting of at least one linearly polarized antenna;
wherein the combined length of both radiation elements of the first set of two radiation elements is longer than the combined length of both radiation elements of the second set of two radiation elements and the combined length of both radiation elements of the second set of two radiation elements is longer than the combined length of both radiation elements of the third set of two radiation elements; and
wherein the first and second antenna systems are configured to provide a MIMO antenna configuration.

7. The antenna system of claim 6, wherein the system is located on a vehicle.

8. The antenna system of claim 6, wherein the system is located within a vehicle.

9. The antenna system of claim 6, wherein the system is located within a mobile device.

10. An antenna system comprising:
a base layer consisting of a first antenna component having at least a first set of two radiation elements joined together in an orthogonal arrangement;
a middle layer consisting of a second antenna component having at least a second set of two radiation elements joined together in an orthogonal arrangement;
a top layer consisting of a third antenna component having at least a third set of two radiation elements joined together in an orthogonal arrangement; and
a feed port;
wherein the combined length of both radiation elements of the first set of two radiation elements is longer than the combined length of both radiation elements of the second set of two radiation elements and the combined length of both radiation elements of the second set of two radiation elements is longer than the combined length of both radiation elements of the third set of two radiation elements; and
wherein the antenna system has nulls of approximately −3 dB or less in the x-y plane.

11. The antenna system of claim 10, wherein the antenna system is located within a mobile device and is aligned with a corner of said mobile device.

12. The antenna system of claim 10, wherein the antenna system is combined with one or more linearly polarized antennas to form a MIMO antenna configuration.

13. The antenna system of claim 12, wherein the MIMO antenna configuration is located on a vehicle.

14. The antenna system of claim 12, wherein the MIMO antenna configuration is located within a vehicle.

15. The antenna system of claim 4, wherein the MIMO antenna configuration is located within a vehicle.

\* \* \* \* \*